United States Patent
Gong et al.

(10) Patent No.: US 6,603,630 B1
(45) Date of Patent: Aug. 5, 2003

(54) METHOD AND APPARATUS FOR MONITORING TRACK MISREGISTRATION

(75) Inventors: Karl Gong, San Jose, CA (US); Bernd Lamberts, Cupertino, CA (US); Thomas Earl Stanley, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,838

(22) Filed: Dec. 28, 1999

(51) Int. Cl.$^7$ .............................................. G11B 5/596
(52) U.S. Cl. .................................................. 360/77.04
(58) Field of Search ........................... 360/77.04, 77.02

(56) References Cited

U.S. PATENT DOCUMENTS

| | | | |
|---|---|---|---|
| 4,799,115 A | 1/1989 | Rogers et al. | 360/66 |
| 5,612,845 A | 3/1997 | Smith | 360/137 |
| 6,181,505 B1 * | 1/2001 | Sacks et al. | 360/77.08 |

* cited by examiner

Primary Examiner—Regina N. Holder
Assistant Examiner—Mitchell Slavitt
(74) Attorney, Agent, or Firm—Altera Law Group, LLC (57) ABSTRACT

A method and apparatus for monitoring track misregistration that is quicker and that is not limited to worst case assumptions. The present invention includes a first memory for accumulating position error signals for a head to produce an accumulated value, a processor for normalizing the accumulated value to produce a normalized result at a predetermined trigger event and a second memory for adding the normalized result therein to produce a running sum; wherein the head is positioned using the running sum. The processor resets the first memory when the normalized result is produced. A counter is provided for incrementing a count value after each position error signal is added to the first memory. The processor normalizes the accumulated value according to the count value of the counter, and the processor resets the counter as a result. In addition, the processor may normalize the accumulated value according to a population mean and a variance associated with the data storage system. The trigger event may include the accumulated error value reaching a predetermined threshold or a servo seek to the next track. The process may be initiated using a self-test command.

24 Claims, 6 Drawing Sheets

METHOD AND APPARATUS FOR MONITORING TRACK MISREGISTRATION

BACKGROUND OF THE INVENTION

1. Field of the Invention

This invention relates in general to disk storage systems, and more particularly to a method and apparatus for monitoring track misregistration.

2. Description of Related Art

Data storage systems typically include one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. Data is transferred to, and retrieved from, specified track locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current though the write element of the transducer assembly to produce magnetic lines of flux which magnetize a specific location of the disk surface. Reading data from a specified disk location is typically accomplished by a read element of the transducer assembly sensing the magnetic field or flux lines emanating form the magnetized locations of the disk. As the read element passes over the rotating disk surface, the interaction between the read element and the magnetized locations on the disk surface results in the production of electrical signals in the read element. The electrical signals correspond to transitions in the magnetic field.

Conventional data storage systems generally employ a closed-loop servo control system for accurately and rapidly positioning the actuator and read/write transducers to specified storage locations on the data storage disk. A servo writing procedure is typically implemented to initially record servo information on the surface of one or more of the data storage disks. A servo writer assembly is typically used by manufacturers of data storage systems to facilitate the transfer of servo data to one or more data storage disks during the manufacturing process. In accordance with one known servo information format, termed an embedded servo, servo information is written between the data storing sectors of each track. The servo data is thus embedded in the data storing tracks of the data storage disks, typically resulting in an alternating sequence of data and servo sectors comprising each track.

In accordance with another known servo information format employed in data storage systems, termed a dedicated servo, the servo writer records servo information typically on only one of the data storage disks comprising the disk stack, and often on only one of the surfaces of the dedicated servo disk. The servo information stored on the dedicated servo disk is used to maintain accurate positioning and alignment of the read/write transducers associated with each of the data storage disks. During normal data storage system operation, a servo transducer, generally mounted proximate the read/write transducers, or, alternatively, incorporated as part of the read element of the transducer, is typically employed to read the servo sector data for the purpose of locating specified track and data sector locations on the disk. It is noted that a servo sector typically contains a pattern of data, often termed a servo burst pattern, used to maintain optimum alignment of the read/write transducers over the centerline of a track when reading and writing data to specified data sectors on the track.

Many factors affect the tracking position of a read-write head during both reading and writing on magnetic disk mediums. It is ideally desired that the read-write head be positioned exactly on the track position for each revolution of the disk during both the read and the write modes of operation. When such perfect track registration is attained, the signal amplitude of the desired data read-back is at a maximum. In such conditions, any newly written data will also occupy the exact same track region as did the old data which it replaces. However, in practical operating systems, the read-write head is very rarely aligned perfectly with the data track that exists. This gives rise to the phenomenon of track misregistration (TMR). Track misregistration is the result of many factors such as mechanical vibration, disk eccentricity or runout, bearing eccentricity and runout, servo system tracking errors and detection errors, etc. Erroneous data can be detected by the read head when significant track misregistration occurs.

It is a routine measurement to estimate the TMR for each head during manufacturing test. This measurement is accomplished by means of: 1) acquiring the PES signal form the drive; and 2) analysis of the PES data to estimate non-repeatable runout (NRRO), repeatable runout (RRO) and random transient vibration (RTV).

The TMR estimate as described has disadvantages. First, the test is costly in terms of test time. Secondly, because of the test time limitation, TMR measurements are restricted to the inner and outer most data cylinders. TMR estimation for the entire surface is interpolated form the ID/OD track measurements.

Pass/fail TMR specification based on this interpolation must assume worst case TMR to avoid potential shipment of a poor performing drive. If more track samples were practical, then a more optimized pass/fail criteria could be realized. This would eliminate the need to base the reject criteria on worst case assumptions and provide a more reliable indication of TMR performance.

Thirdly, the correlation with real customer environments is unclear because the TMR pretest is constrained to a particular test time. For example, thermal track shift in a particular customer environment would not be accounted for due to a difference in ambient temperature outside the file.

This temperature difference results in track misregistration because the arms and the disk comprise different materials that have different thermal expansion coefficients.

Finally, the TMR pretest is useful for maintaining quality control during manufacturing. However, the TMR pretest obviously is not useful for determining in the field when a drive may need to be recalibrated to solve problems encountered in the field. For this scenario, an actual field TMR test is needed. However, files do not include means for performing a self-test of the file in the field.

It can be seen that there is a need for a method and apparatus for monitoring track misregistration that is quicker and that is not limited to worst case assumptions.

It can also be seen that there is a need for a method and apparatus for performing TMR self-test in the field.

SUMMARY OF THE INVENTION

To overcome the limitations in the prior art described above, and to overcome other limitations that will become apparent upon reading and understanding the present specification, the present invention discloses a method and apparatus for monitoring track misregistration.

The present invention solves the above-described problems by providing a method and apparatus for monitoring track misregistration that is quicker and that is not limited to worst case assumptions.

A system in accordance with the principles of the present invention includes a first memory for accumulating position error signals for a head to produce an accumulated value, a processor for normalizing the accumulated value to produce a normalized result at a predetermined trigger event and a second memory for adding the normalized result therein to produce a running sum; wherein the head is positioned using the running sum, the processor resetting the first memory when the normalized result is produced.

Other embodiments of a system in accordance with the principles of the invention may include alternative or optional additional aspects. One such aspect of the present invention is that a counter is provided for incrementing a count value after each position error signal is added to the first memory.

Another aspect of the present invention is that the processor normalizes the accumulated value according to the count value of the counter, and wherein the processor resets the counter as a result.

Another aspect of the present invention is that the processor normalizes the accumulated value according to a population mean and a variance associated with a profile of the system.

Another aspect of the present invention is that the trigger event includes the accumulated error value reaching a predetermined threshold.

Another aspect of the present invention is that the trigger event includes a servo seek to the next track.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 3b–c illustrate an ideal and actual PES signal in relation to the position of the read element of FIG. 3a;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for monitoring track misregistration that is quicker and that is not limited to worst case assumptions.

Figure 1:
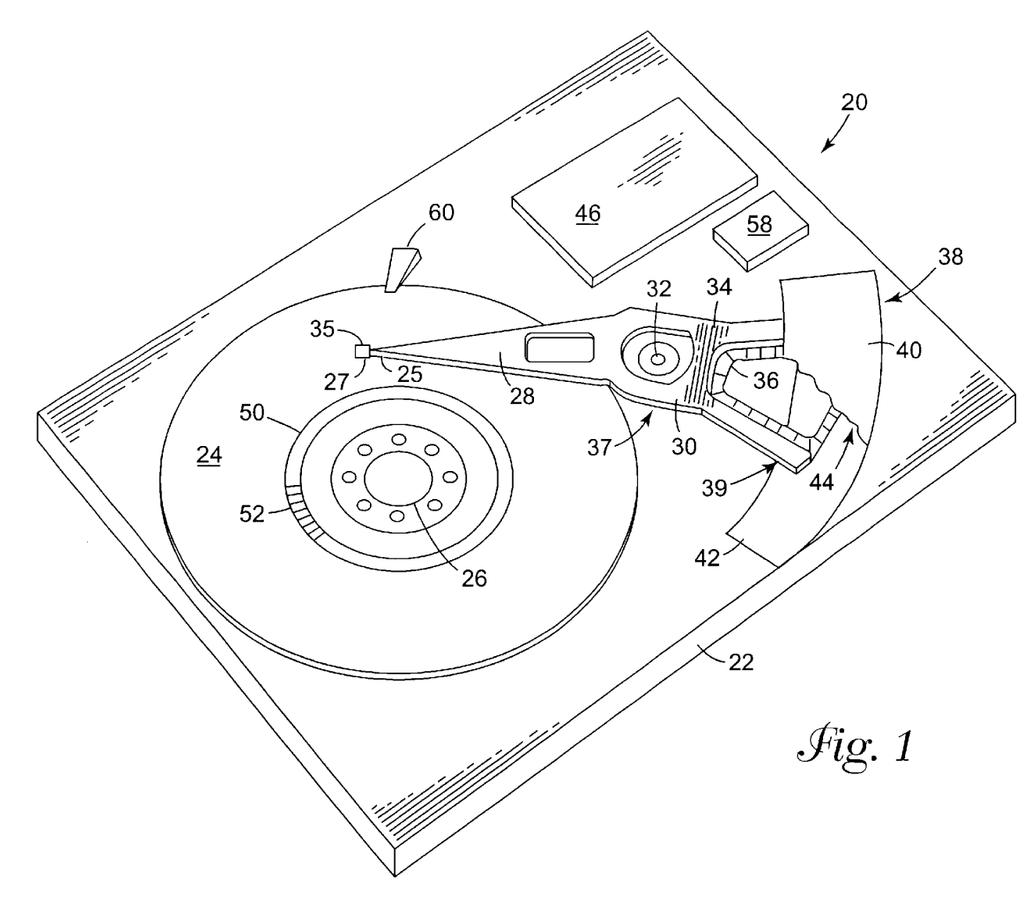
FIG. 1 illustrates a data storage system with the cover removed from the base of the housing.
Figure 2:
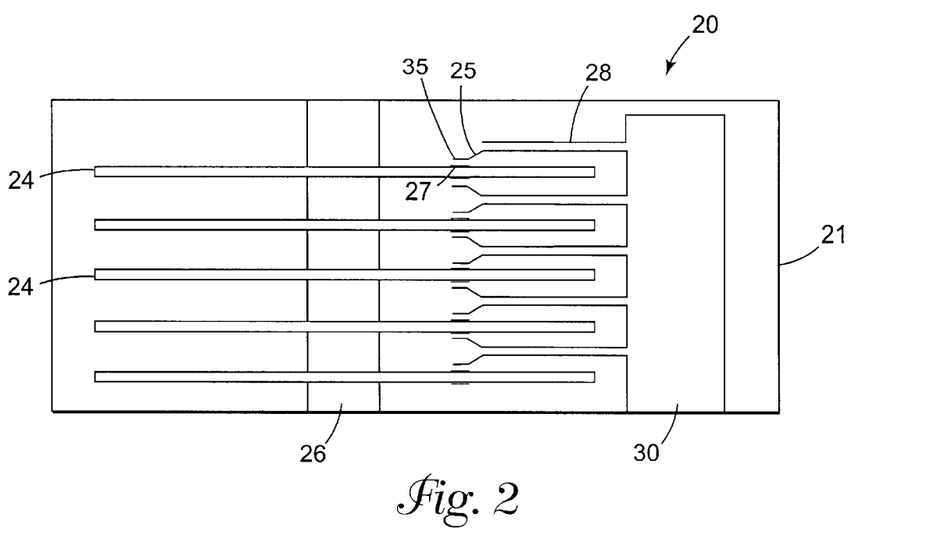
FIG. 2 is a side view of the data storage system including a plurality of disk.

FIG. 1 illustrates a data storage system 20 with the cover 23 removed from the base 22 of the housing 21. FIG. 2 is a side view of the data storage system 20 including a plurality of disk 24. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiraled track configuration.

An actuator 30 typically includes a plurality of interleaved actuator arms 28, with each arm having one or more transducer 27 and slider body 35 assemblies mounted to a load beam 25 for reading and writing information to and from the data storage disks 24. The slider body 35 is typically designed as an aerodynamic lifting body that lifts the transducer 27 off the surface of the disk 24 as the rate of spindle motor 26 rotation increases, and causes the transducer 27 to hover above the disk 24 on an air bearing or airflow patterns produced by high-speed disk rotation. A conformal lubricant may alternatively be disposed on the surface of the disk 24 to reduce static and dynamic friction between the slider body 35 and surface of the disk 24.

The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically includes a polyphase, a/c, motor or, alternatively, a dc motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuitry that coordinates the transfer of data to and from the data storage disks 24, and cooperates with the actuator voice coil motor 39 to move the actuator arms 28 and transducers 27 to prescribed track 50 and sector 52 locations when reading and writing data to and from the disks 24.

Figure 3A:
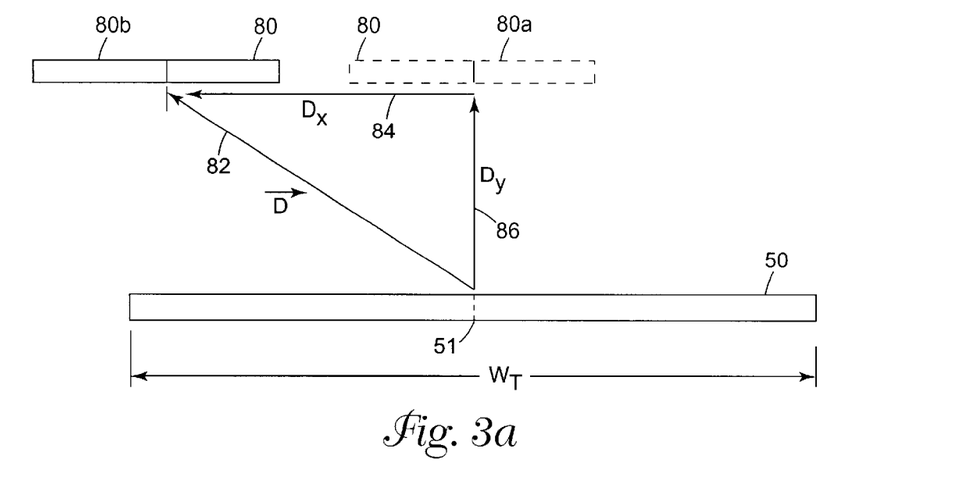
FIG. 3a illustrates a read element of the transducer oriented over the centerline of a track and oriented off-center with respect to the track centerline.

Turning now to FIG. 3a, there is shown an illustration of a read element 80 of the transducer 27 oriented over the centerline 51 of a track 50 and oriented off-center with respect to the track centerline 51. For purposes of clarity, the read element 80 oriented above the centerline 51 of the track 50 is designated as the read element 80a, and the read element 80 oriented off-center with respect to the track centerline 51 is designated as the read element 80b. As the read element 80 passes over the track 50 of the rotating disk 24, magnetic transitions developed on the disk 24 surface result in the production of a readback signal induced in the read element 80. By way of example and not of limitation, the readback signal is preferably a voltage signal. With further reference to FIG. 3a, a vector D 82 is shown extending from the track centerline 51 to the center of the read element 80b. The vector D 82 is shown as having a vertical Y-axis component $D_y$ 86 and a horizontal X-axis component $D_x$ 84. It is noted that the read element 80a when oriented above the track centerline 51 has no horizontal component $D_x$ 84, and only a vertical component $D_y$ 86.

Figure 3B:
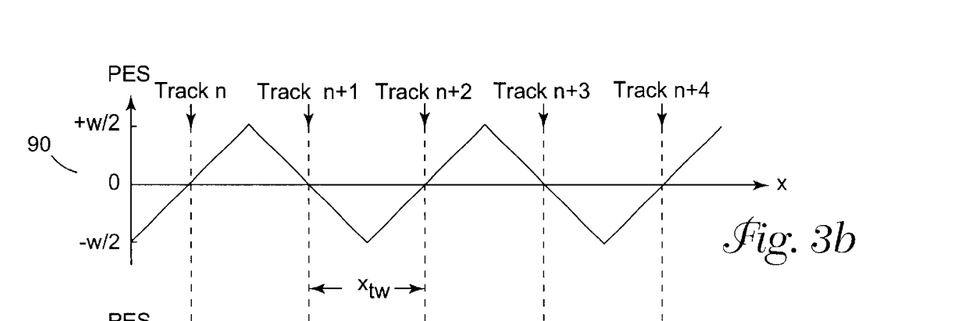
Figure 3C:
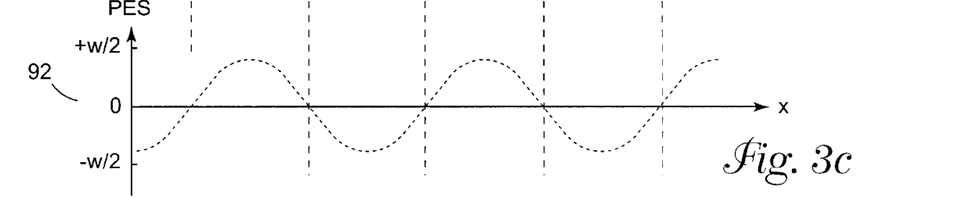

FIG. 3b illustrates an ideal triangular position error signal (PES) waveform 90 demonstrating the PES being proportional to the relative difference of the positions of the center of the servo head and the nearest track center. FIG. 3b illustrates an actual PES waveform 92. Accordingly, the PES is proportional to $D_x$.

Figure 4:
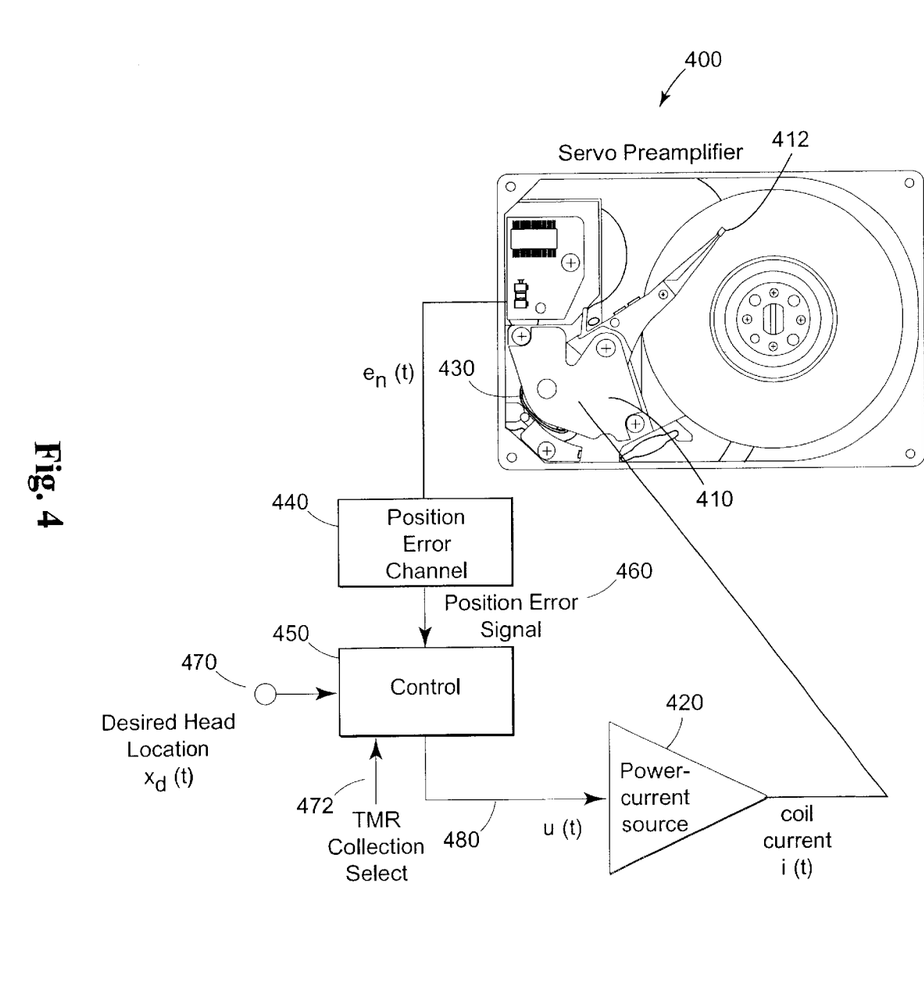
FIG. 4 illustrates a block diagram of a typical head-positioning servo system with a rotary actuator.

FIG. 4 illustrates a block diagram 400 of a typical head-positioning servo system with a rotary actuator. As illustrated in FIG. 4, the control system plant, wherein plant herein refers to the subsystem to be controlled, includes the actuator 410, the servo preamplifier 420 that drives the current into the coil 430, and the position error channel 440. The angular position of the heads 412, and hence the entire moving inertia of the actuator assembly, is denoted by x(t).

The position error channel 440 receives a position of the actuator $e_n(t)$ and determines the position error signal 460. The controller 450 then compares the position error signal 460 and the desired position command $x_d(t)$ input 470 to determine the best control signal u(t) 480 to reduce the position error to as close to zero as is practical. The controller may also receive, according to the present invention, a signal for selecting TMR data collection 472.

The controller 450 therefore may use the position error signal 460 to assess TMR performance according to the present invention as will be described more fully with reference to FIGS. 5 and 6 below.

The heads 412, when located at a fixed and predetermined radial distance with respect to the center of disk rotation, are said to be track-following. As described above, the goal while reading and writing data is keep the heads 412 following the same radial path throughout the lifetime of the disk file. Ideally, this path is a perfect circle, requiring that x(t) of the actuator remain constant in order to track-follow. In reality, disk vibration, spindle vibration, spindle bearing runout and imperfections in the position measurement reference require a significant control action and motion x(t) to reduce head-position error to near zero.

Figure 5:
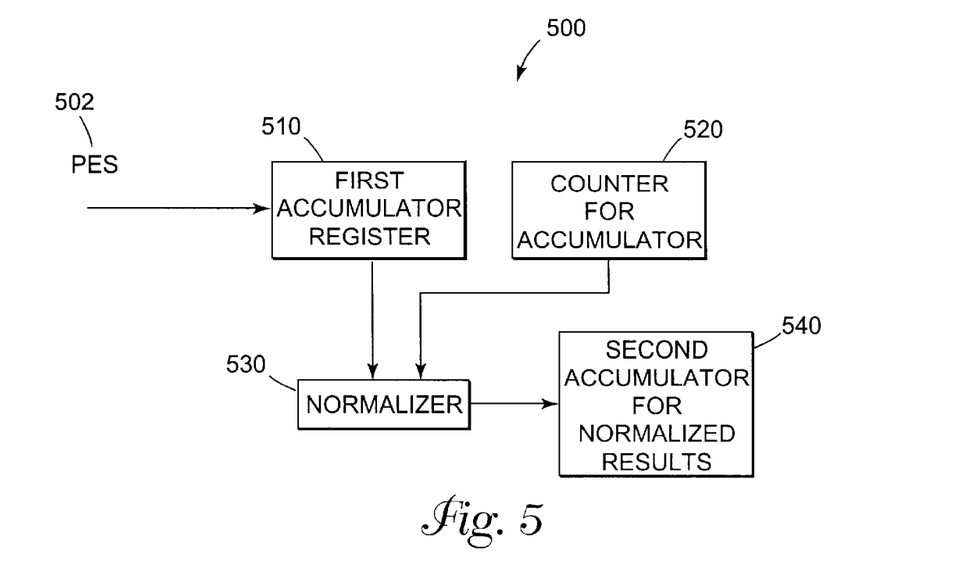
FIG. 5 illustrates a block diagram of a TMR monitoring facility according to the present invention.

FIG. 5 illustrates a block diagram of the controller 500 for performing TMR data collection according to the present invention. Each head in the file is allocated three memory locations: a first accumulator register 510, a counter for the accumulator 520 and a second accumulator for the normalized results 540. At track follow, the servo starts adding the square of the position error signal 502 into the first accumulator 510 and increments the counter 520 for each entry. As soon as a trigger event occurs, e.g., a certain threshold of values is reached or the servo seeks to the next track, the value in the first accumulator 510 is normalized by a normalizer 530, e.g., using the counter value. The normalized value is then added to produce a running sum of the normalized results in the second accumulator 540. Finally, the first accumulator 510 and the counter 520 are reset. Moreover, the running sum in the second accumulator is determined for each track.

The controller 500 according to the present invention is extendible to field use as well. In this scenario, the same type of measurement is performed and accumulated in the first accumulator 510, but the reported result is normalized by the normalizer 530 to the population mean and variance of the shipped files, i.e., the file profile, to achieve uniform performance across the shipped drives. The population mean and variance is derived from the factory manufacturing data base and written to the reserved area. In this manner, a customer command may be used to initiate self test of the file.

Figure 6:
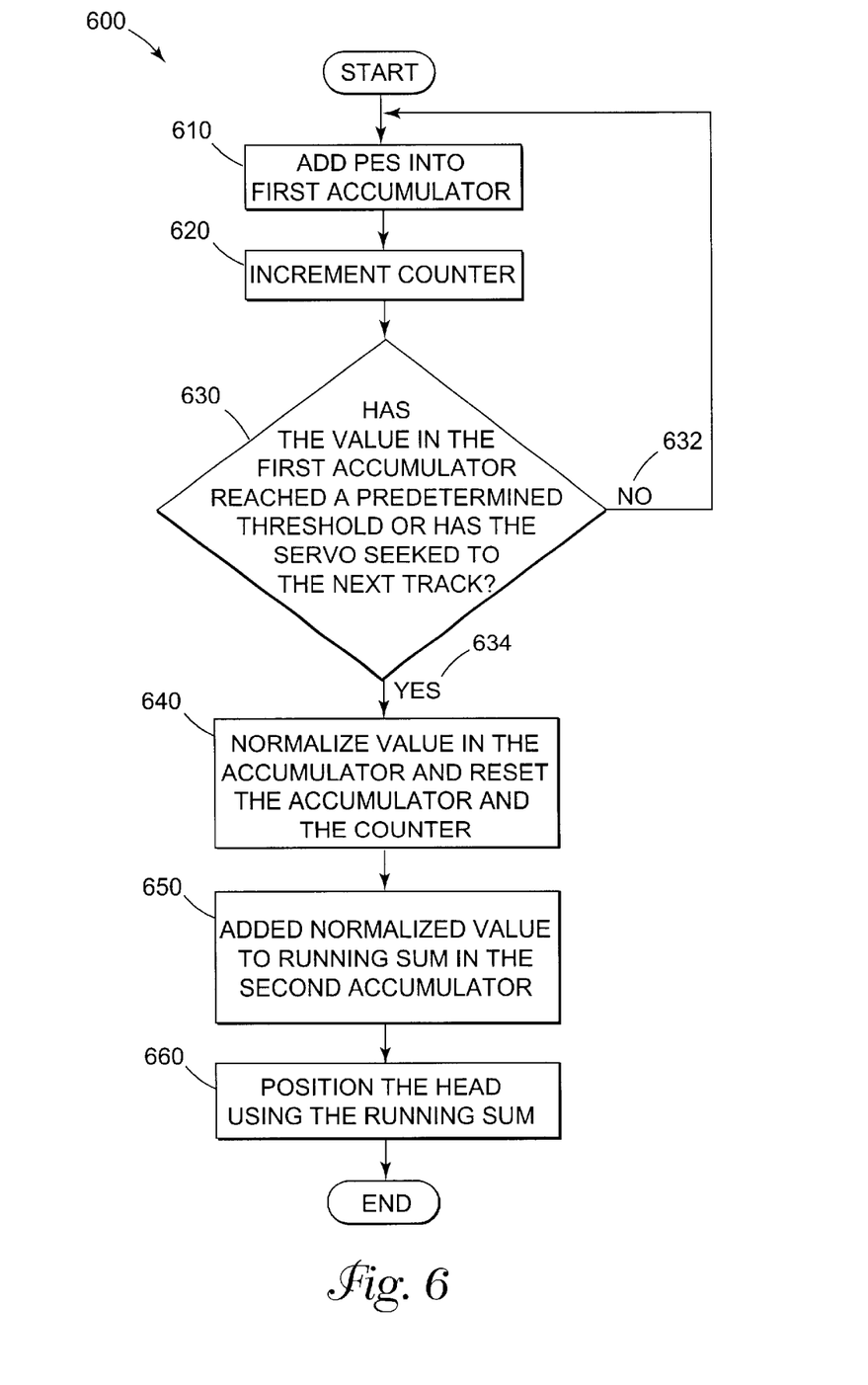
FIG. 6 is a flow chart of the operation of the TMR monitoring according to the present invention.

FIG. 6 is a flow chart 600 of the operation of the TMR monitoring according to the present invention. In FIG. 6, the servo starts adding the square of the position error signal into the accumulator 610 and increments the counter 620 for each entry at track follow. A determination is made as to whether a certain threshold of values is reached, or whether the servo seeks to the next track 630. If the threshold is not reached or the servo has not performed a seek to the next track 632, the process loops back to continue to add position error signal to the first accumulator 610. If the threshold is reached or the servo seeks to the next track 634, the value in the accumulator is normalized and the accumulator and the counter are reset 640. The normalized value is added to the running sum 650 in the second accumulator. The running sum is then used to position the head 660. Moreover, the running sum in the second accumulator is determined for each track.

Figure 7:
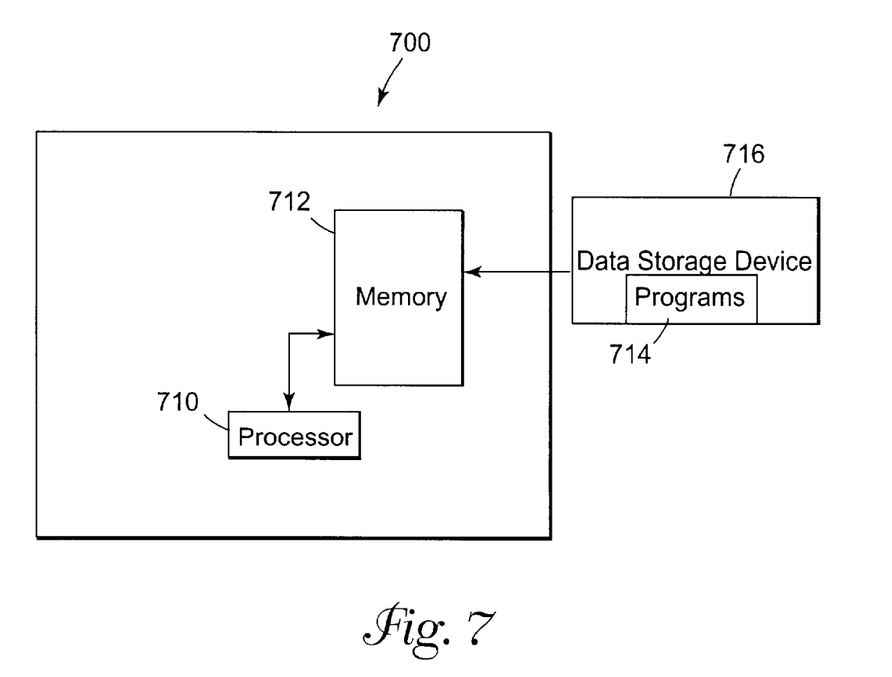
FIG. 7 illustrates a block diagram of a controller that is configured to execute the TMR monitoring method in accordance with the present invention.

FIG. 7 illustrates a block diagram of a controller 700 that is configured to execute the TMR monitoring method in accordance with the present invention. The controller 700 includes a processor 710 and memory 712. The processor 710 executes one or more computer programs, which are represented in FIG. 7 by the window 714. Further, those skilled in the art will recognize that the processor 710 controls the contents of the memory 712, which may be used to provide the first accumulator, the counter, and the second accumulator, and may be used to normalize the accumulated value as shown above with reference to FIGS. 5–6.

Generally, the computer programs 714 may be tangibly embodied in a computer-readable medium or carrier, e.g. one or more of the fixed and/or removable data storage devices 716, or other data storage or data communications devices. The computer programs 714 may be loaded from the data storage devices 716 into the memory 712 for execution by the processor as 710 discussed above. The computer programs 714 comprise instructions which, when read and executed by the processor 710, causes the controller 700 to perform the steps necessary to execute the steps or elements of the present invention.

Although an exemplary controller configuration is illustrated in FIG. 7, those skilled in the art will recognize that any number of different configurations performing similar functions may be used in accordance with the present invention.

The processor 710 executes the method according to the present invention. Those skilled in the art will recognize that the processor executes IP code or an external driver program that performs the data collection, allowing a real time TMR measurement to be generated under custom conditions for each head, without any additional test time requirements. The IP code may be preferable, since the IP code memory is generally less expensive and allows more data manipulation offline. Another advantage to the present invention is that latency or queuing impacts are naturally taken into account. To make the test more flexible and controlled, a flag may be used to turn on and off the measurement. The number of samples that are to be stored is variable.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for monitoring track misregistration in a data storage system, comprising:
   at an initiating event starting to accumulate position error signals for a head in a first accumulator to produce an accumulated value;
   normalizing the accumulated value to produce a normalized result at a trigger event and resetting the first accumulator;
   adding the normalized result to a second accumulator to produce a running sum of normalized results in the second accumulator; and
   positioning the head using the running sum.

2. The method of claim 1 further comprising incrementing a counter for each position error signal added to the first accumulator.

3. The method of claim 2 wherein the accumulated value is normalized according to the value of the counter and the resetting further comprises resetting the counter.

4. The method of claim 1 wherein the accumulated value is normalized to a population mean and a variance associated with the data storage system to achieve uniform performance for the data storage system.

5. The method of claim 1 wherein the trigger event comprises the accumulated error value reaching a predetermined threshold.

6. The method of claim 1 wherein the trigger event comprises a servo seek to the next track.

7. The method of claim 1 wherein the initiating event is a track follow command.

8. The method of claim 1 wherein the initiating event is a self-test command.

9. A servo controller of a data storage system, comprising:
   a first memory for starting to accumulate position error signals for a head to produce an accumulated value in response to an initiating event;
   a processor for normalizing the accumulated value to produce a normalized result at a predetermined trigger event, wherein the processor resets the first memory when the normalized result is produced; and
   a second memory for adding the normalized result therein to produce a running sum of normalized results in the second memory; wherein the head is positioned using the running sum.

10. The servo controller of claim 9 further comprising a counter for incrementing a count value after each position error signal is added to the first memory.

11. The servo controller of claim 10 wherein the processor normalizes the accumulated value according to the count value of the counter, and wherein the processor resets the counter as a result.

12. The servo controller of claim 9 wherein the processor normalizes the accumulated value according to a population mean and a variance associated with the data storage system to achieve uniform performance for the data storage system.

13. The servo controller of claim 9 wherein the trigger event comprises the accumulated error value reaching a predetermined threshold.

14. The servo controller of claim 9 wherein the trigger event comprises a servo seek to the next track.

15. The servo controller of claim 9 wherein the initiating event is a track follow command.

16. The servo controller of claim 9 wherein the initiating event is a self-test command.

17. A data storage device, comprising
   a rotatable data storage disk;
   an actuator assembly including an actuator having a transducer disposed at a distal end thereof; and
   a servo controller for controlling the actuator to position the transducer relative to the disk to provide for data transfer between the transducer and the disk, the servo controller comprising:
   a first memory for starting to accumulate position error signals for the head to produce an accumulated value in response to an initiating event;
   a processor for normalizing the accumulated value to produce a normalized result at a predetermined trigger event, wherein the processor resets the first memory when the normalized result is produced; and
   a second memory for adding the normalized result therein to produce a running sum of normalized results in the second memory; wherein the head is positioned by the actuator assembly using the running sum.

18. The data storage device of claim 17 further comprising a counter for incrementing a count value after each position error signal is added to the first memory.

19. The data storage device of claim 18 wherein the processor normalizes the accumulated value according to the count value of the counter, and wherein the processor resets the counter as a result.

20. The data storage device of claim 17 wherein the processor normalizes the accumulated value according to a population mean and a variance associated with the data storage device to achieve uniform performance for the data storage device.

21. The data storage device of claim 17 wherein the trigger event comprises the accumulated error value reaching a predetermined threshold.

22. The data storage device of claim 17 wherein the trigger event comprises a servo seek to the next track.

23. The data storage device of claim 17 wherein the initiating event is a track follow command.

24. The data storage device of claim 17 wherein the initiating event is a self-test command.

* * * * *